United States Patent Office 3,219,009
Patented Nov. 23, 1965

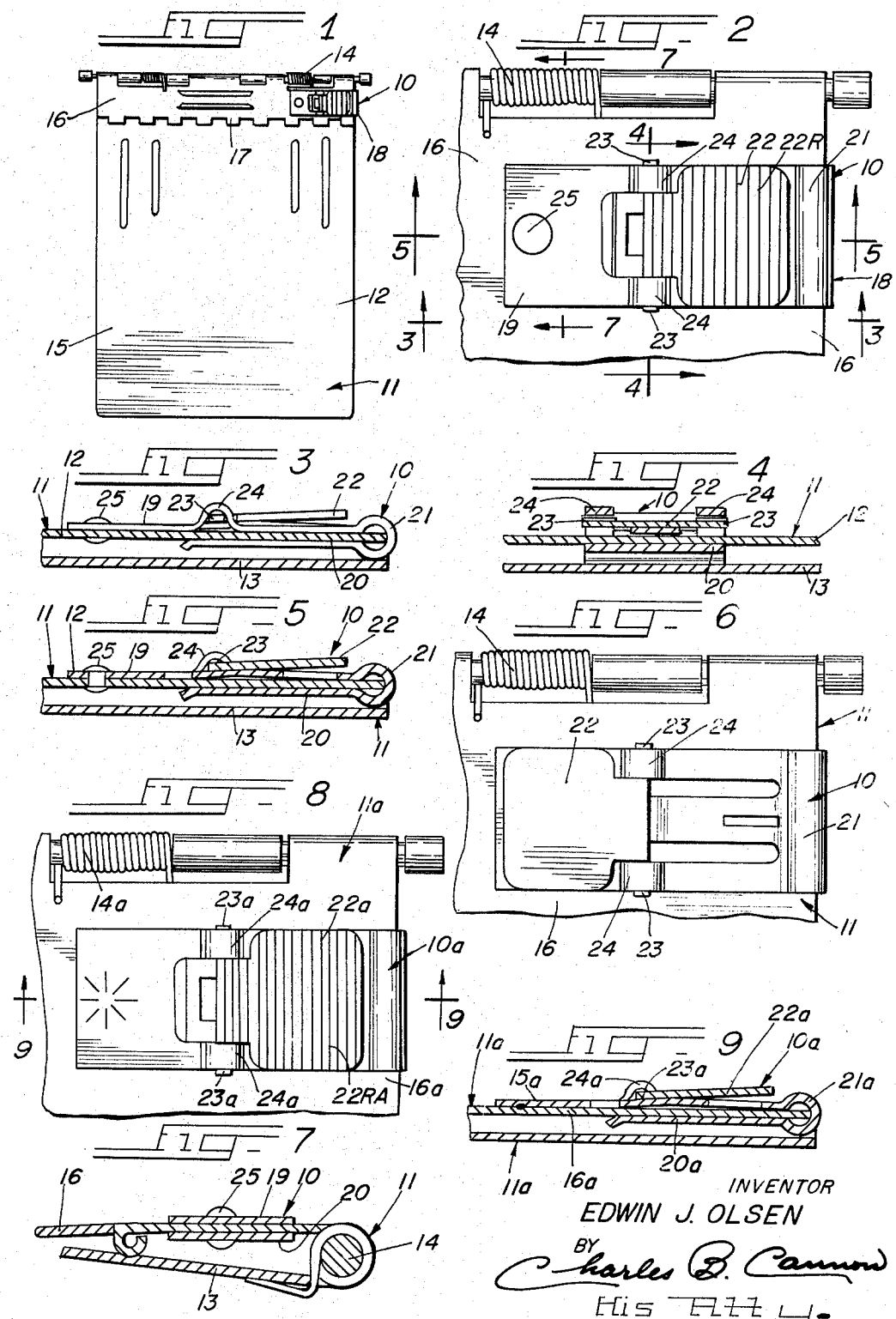

3,219,009
WARNING SIGNAL FOR A HOSPITAL CHART HOLDER
Edwin J. Olsen, Park Ridge, Ill., assignor to The Algonquin Corporation, Skokie, Ill., a corporation of Illinois
Filed July 20, 1965, Ser. No. 473,402
3 Claims. (Cl. 116—134)

This invention relates to a warning signal for a hospital chart holder.

It is now rather common practice in hospitals to use chart holders with which warning signals are associated so that when the chart holder is opened and the doctor places instructions therein to the nurse, he manipulates the warning signal into a position to indicate to the nurse that he has left instructions on the chart for the patient and when the nurse has complied with the instructions of the doctor on the chart she manipulates the warning signal into a position to indicate that she has carried out the doctor's instructions.

An object of the present invention is to provide a new and improved warning signal for a hospital chart holder.

An additional object of the present invention is to provide a new and improved warning signal for a hospital chart holder which is relatively simple and inexpensive in construction and which may be readily attached to a hospital chart holder.

Another object of the invention is to provide in one form thereof a warning signal for a hospital chart which may be readily and slidably inserted upon and removed from its position of use upon the chart holder without in any way modifying or mutilating the chart holder itself.

Other objects will appear hereinafter.

In the drawings:

FIG. 1 is a top plan view of a hospital chart holder having a typical form of the new warning signal attached thereto;

FIG. 2 is an enlarged fragmentary top plan view of the hospital chart shown in FIG. 1 of the new warning signal attached thereto;

FIG. 3 is a view on line 3—3 in FIG. 2 partly in elevation and partly in section;

FIG. 4 is a transverse sectional view on line 4—4 in FIG. 2;

FIG. 5 is a longitudinal sectional view on line 5—5 in FIG. 2;

FIG. 6 is a fragmentary top plan view of the hospital chart holder shown in FIG. 1 and showing the warning signal moved to its normal position prior to use;

FIG. 7 is a sectional view on line 7—7 in FIG. 1;

FIG. 8 is a fragmentary top plan view illustrating a modification of the invention; and FIG. 9 is a longitudinal sectional view on line 9—9 in FIG. 8.

A typical embodiment of the new warning signal unit for a hospital chart holder is shown in FIGS. 1 to 7, inclusive, of the drawings, where it is generally indicated at 10, and as shown being used in conjunction with a hospital chart holder 11 which includes a hingedly movable top or cover member 12 and a relatively stationary bottom member 13; the cover member 12 being hingedly connected to its upper end, as at 14, to the bottom member 13.

The cover member 12 is divided into a lower section 15, and an upper section 16 and these sections 15–16 are interconnected by a hinge joint 17, as is well understood in the art.

The form of the new warning signal 10 illustrated in FIGS. 1 to 7, inclusive, of the drawings, embodies a generally U-shaped member 18 which may be made of any suitable material such, for example, as spring steel, aluminum, resinous plastic materials, or the like, and includes an upper arm member 19 and a lower arm member 20 integrally connected thereto by generally cylindrical resilient or spring action hinge joint 21 so that the warning signal unit 10 may be slidably inserted onto the upper section B of the top cover member 12, from one side thereof, and adjacent the hinge unit 14, as shown.

In the form of the invention illustrated in FIGS. 1 to 7, inclusive, the generally U-shaped member 18 is permanently fastened to the upper portion 16 of the top cover member 12 in any suitable manner, as by means of fastening means in the form of a rivet 25 which is inserted through suitable aligned openings formed in the upper section 16 of the top cover member 12 and in the upper arm 19 of the generally U-shaped member 18.

The new warning signal unit 10, as shown in FIGS. 1 to 7, inclusive, includes a movable indicium-bearing or flag member 22 which includes an end portion of reduced area having hinge portions or pintles 23 formed therein and these hinge portions or pintles 23 are pivotally mounted within raised or boss-like hinge elements 24 which are formed at the longitudinal side edges of the upper arm member 19 of the warning signal unit 10.

The movable indicium-bearing or flag member 22 may have one surface thereof provided with suitable warning indicium such, for example, as the red color 22R indicated thereon, so that when the movable indicium-bearing or flag member 22 is moved into the position in which it is shown in FIGS. 1, 2, 3, 4 and 5 of the drawings, the red colored indicium 22R on the top surface of the movable flag member 22 is disposed in a position to indicate a warning to the nurse to the effect that the doctor has left an order in the chart holder for the nurse to carry out in reference to the patient. However, the opposite side of the movable indicium-bearing or flag member 22 may be left uncolored or may be colored white, or provided with any other suitable indicium, so that after the nurse has carried out the doctor's instructions in the chart the movable flag member 22 may then be pivoted on its hinge connection 23–24 from the position in which it is shown in FIGS. 1 to 5, inclusive, into the position in which it is shown in FIG. 6 and in which the opposite face of the movable member will be upright, and the warning signal indicium 22R obscured, thereby indicating to the nurse that the doctor's instructions in the chart have been carried out.

A modification of the invention is illustrated in FIGS. 8 and 9 of the drawings and those parts thereof which are similar to or comparable to parts of the invention illustrated in FIGS. 1 to 7, inclusive, have been given the same reference numerals followed by the additional and distinguishing reference character *a*.

The form of the invention illustrated in FIGS. 8 and 9 of the drawings is substantially similar to that shown in FIGS. 1 to 7, inclusive, of the drawings except that in this form of the invention the new warning signal unit 10a is slidably and frictionally inserted onto the upper section 16a of the top cover member 12a of the chart 11a and is frictionally held therein by the frictional engagement of the top and bottom resilient spring arm members 15a and 16a, acting under the tension of the resilient hinge or spring joint 21a, rather than being permanently mounted on the upper section of the top cover member of the chart holder, as in the form of the invention illustrated in FIGS. 1 to 7, inclusive. Hence, the form of the invention illustrated in FIGS. 9 and 10 of the drawings may be readily inserted into position of use on the chart holder 11a and removed therefrom, as desired, without in any way modifying or mutilating the chart holder.

It will thus be seen from the foregoing description, considered in conjunction with the accompanying drawings, that the present invention provides a new and improved warning signal unit for a hospital chart holder, having the desirable advantages and characteristics and accomplishing its intended objects included those hereinbefore pointed out and others which are inherent in the invention.

I claim:

1. A warning signal unit for a hospital chart holder of the type which includes a bottom member and a top cover member hingedly secured together, said warning signal unit comprising substantially parallel interconnected top and bottom members adapted to be inserted onto the said top cover member from a side marginal edge thereof, an indicium-bearing or flag member comprising a relatively flat indicium-bearing plate hingedly mounted upon the said top member of the said warning signal unit and having on one side thereof a warning signal indicium, and hinge means for pivotally mounting the said indicium-bearing or flag member on the said top member of the said warning signal unit so that the said indicium-bearing or flag member may be pivotally moved upon and relative to the said top member of the said warning signal unit between a position to expose the said warning signal indicium and a position to obscure the same.

2. A warning signal unit as defined in claim 1 which includes means for permanently fastening the said warning signal unit upon the said top cover member of the said hospital chart holder.

3. A warning signal unit as defined in claim 1 in which the said warning signal unit is slidably inserted upon the said top cover member of the said hospital chart holder and is removable from its position of use thereon.

References Cited by the Examiner

UNITED STATES PATENTS

| 1,442,904 | 1/1923 | Petty | 129—15 |
| 2,731,941 | 1/1956 | Anderson | 116—135 |

FOREIGN PATENTS 551,543   1/1923   France.

LOUIS J. CAPOZI, *Primary Examiner.*